Patented Dec. 19, 1922.

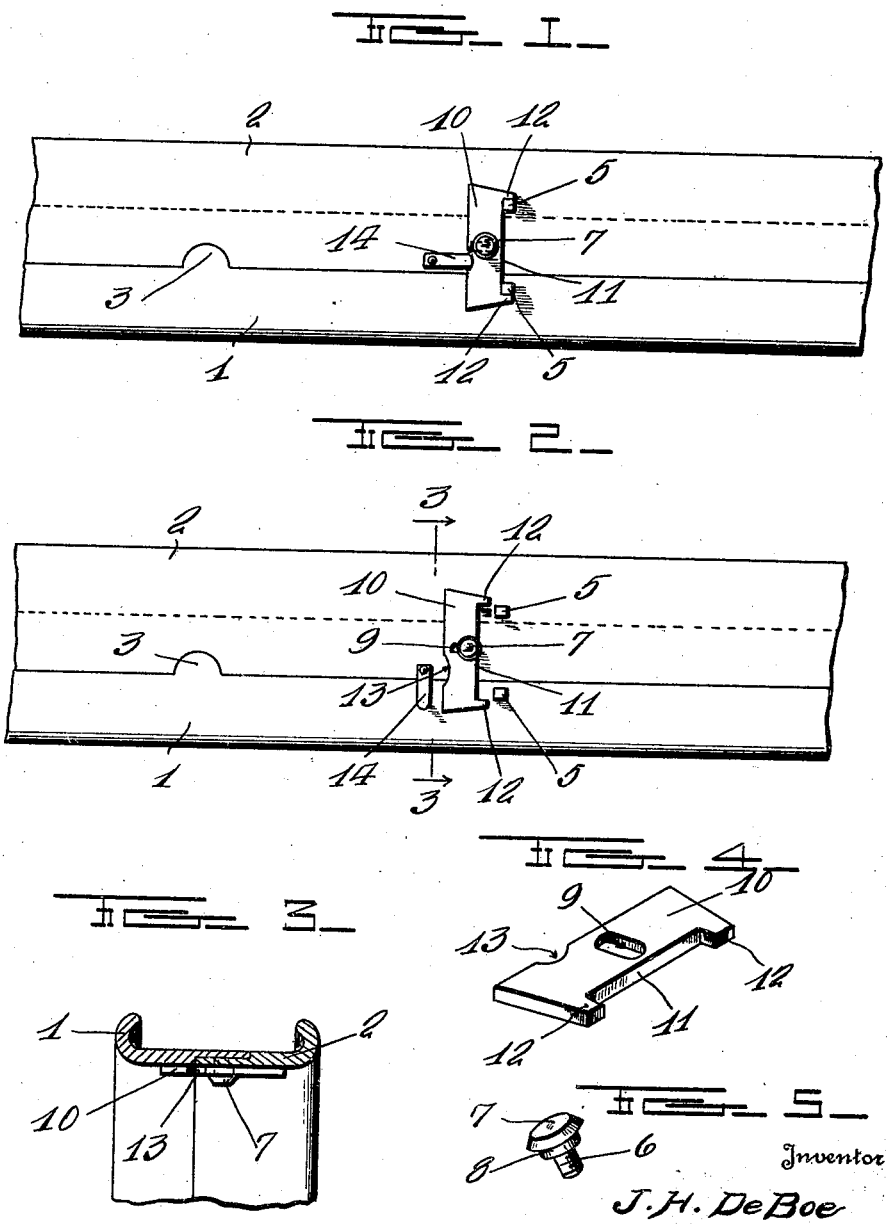

1,439,613

UNITED STATES PATENT OFFICE.

JOHN HARVEY DE BOE, OF LOUISE, MISSISSIPPI.

RIM LOCK.

Application filed November 14, 1921. Serial No. 514,993.

*To all whom it may concern:*

Be it known that I, JOHN H. DE BOE, a citizen of the United States, residing at Louise, in the county of Humphreys and State of Mississippi, have invented certain new and useful Improvements in a Rim Lock, of which the following is a specification.

My invention relates to automobile rims and has particular reference to means for locking the sections of a circumferentially divided rim. The primary object of the invention is to provide an efficient locking means which will absolutely hold the rim sections in locked relation and which is readily applied and easily manipulated.

A further object of the invention is to provide a rim-lock constructed in a novel form and designed to operate in a new and efficient manner.

With these and such other objects in view as will be apparent from the description, my invention resides in the novel construction, combination and arrangement of parts hereinafter described and claimed and illustrated in the accompanying drawings, in which—

Figure 1 is an inner plan view of a portion of a rim showing my lock as applied with the rim sections in locked position;

Fig. 2, a similar view with the lock member disengaged;

Fig. 3, a sectional view on the line 3—3 of Figure 2;

Fig. 4, a perspective of the lock plate employed; and

Fig. 5, a perspective illustrating the pin by which the locking plate is attached.

My improved lock is adapted to be used in connection with circumferentially divided rims, and comprises a plurality of the locking means shown, the details of only one being illustrated. As illustrated in Figure 1, the rim consists of the two sections 1 and 2, one section of which carries positioning lugs 3 adapted to be received in suitable recesses formed in the other of said sections, whereby to prevent longitudinal slipping of the sections relative to one another. Each of said sections is formed on its inner surface with the projecting lug 5, the lugs being disposed in alignment transversely of the rim, for a purpose to be described.

One of said rim sections is provided with a pin 6 adapted to be threaded into the section and projecting from the inner surface thereof, and provided with an enlarged head 7 having a reduced portion 8 adapted to be disposed in a slot 9 formed in a locking plate 10 carried by the pin and held against the inner surface of the rim sections by means of the enlarged head 7, as illustrated in Figures 1 and 2. The locking plate 10 comprises a substantially rectangular member having a recess 11 formed in one edge thereof whereby to provide shoulders 12 at opposite ends of the plate. The depth of the recess 11 is such as to receive the lugs 5 carried by the rim sections and the length of the recess is such as to provide for an engagement of the shoulders 12 around the lugs 5 when the rim sections are in connected position, as illustrated in Figure 1. The opposite edge of the plate 10 is provided with a substantial arcuate recess 13, which is adapted to receive one end of a latch member 14 pivoted on one of the sections at a point spaced laterally from the locking plate.

In operation, the rim sections 1 and 2 are joined and the locking plate 10, by reason of the disposition of pin 6, and elongated slot 9, is then slipped into engagement with the lugs 5 to retain the same within the recess 11 against the shoulders 12, and the latch member 14 is then swung into engagement with the recess 13, whereby said locking plate will be effectually held in position and the rim sections will be prevented from becoming detached owing to the engagement of the lugs and shoulders as described. To unfasten the parts, it is simply necessary to release the latch member 14 whereupon the locking plate 10 may be slipped to disengage the shoulders 12 from the rim lugs whereupon the parts may be disassembled.

While I have shown and described certain details and materials which enter into the construction and operation of my invention, I desire it to be understood that I do not intend to limit myself to these, but that any such may be used as will fall within the scope of the invention as claimed.

I claim:

1. In a circumferentially divided demountable rim, a plurality of lugs carried by the rim sections, headed pins carried by one of said sections, locking plates secured to said section by means of said pins, said plates being provided with elongated apertures to receive said pins for slidable movement of the plates relative to the rim section, shoulders formed on said plates for engagement with said rim lugs to retain the rim sections in joined position, and latch members carried by one of said rim sections and adapted to engage said locking plates to hold same in locked position.

2. In a demountable rim having circumferentially divided rim sections, a plurality of substantially rectangular locking plates provided at substantially their central portions with elongated apertures, headed pins disposed in said apertures and adapted to be engaged in a rim section for disposing said locking members in slidable relation thereon, shoulders carried by said locking plates, means on the rim sections adapted for engagement with said shoulders for locking said rim sections, and means adapted to engage an edge of said locking plates for retaining said plates in locked position.

In testimony whereof I affix my signature.

JOHN HARVEY DE BOE.